INVENTORS.
Egbert M. Jones
Richard J. Thomas
BY
ATTORNEY.

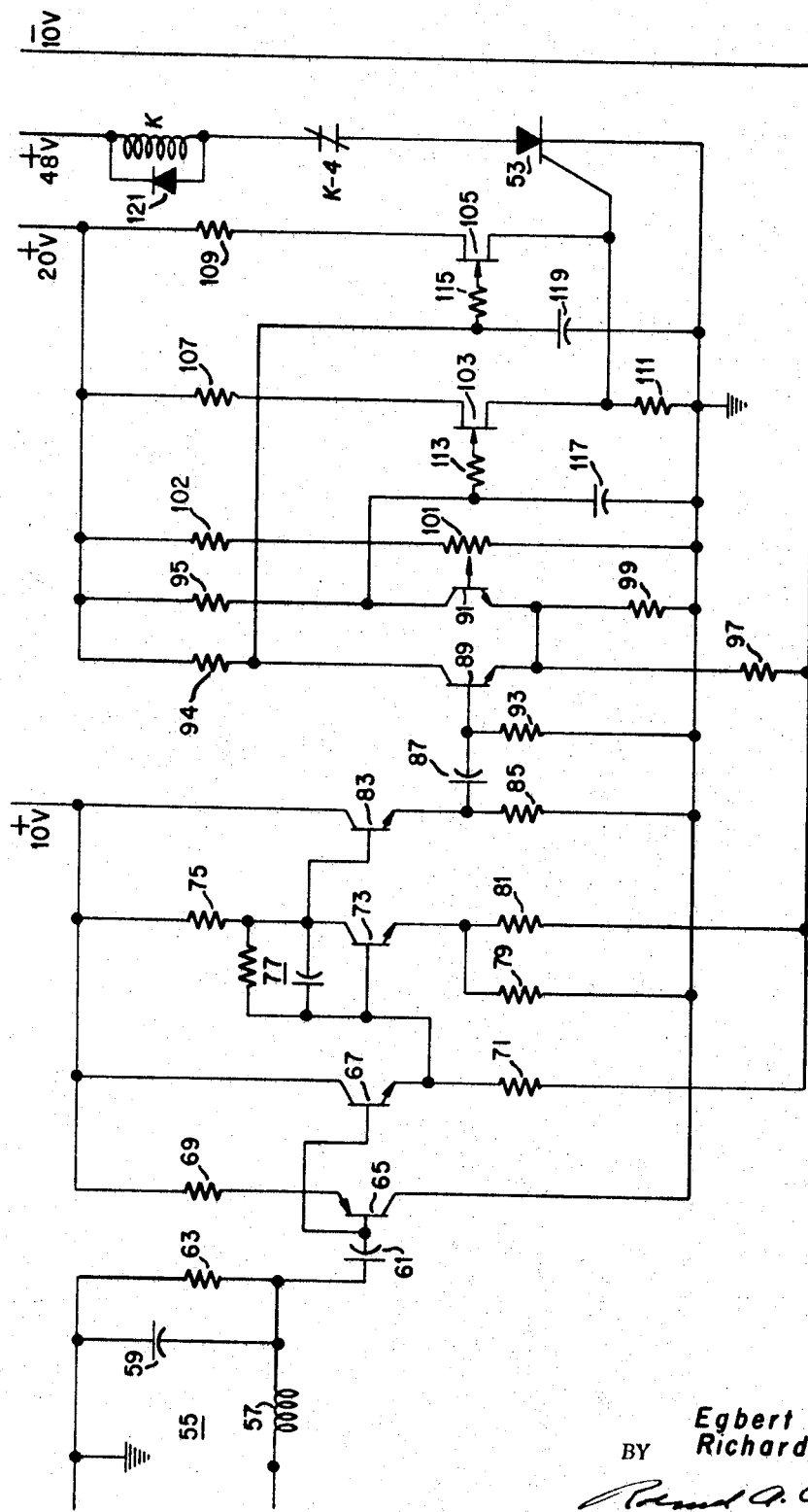

ÚUnited States Patent Office 3,421,015
Patented Jan. 7, 1969

3,421,015
ELECTRICAL LOAD CONTROLLER
Egbert M. Jones, Evansville, Ind., and Richard J. Thomas, Paducah, Ky., assignors to the United States of America as represented by the United States Atomic Energy Commission
Filed Oct. 5, 1967, Ser. No. 673,223
U.S. Cl. 307—34                      6 Claims
Int. Cl. H02j 1/04; 3/14

ABSTRACT OF THE DISCLOSURE

A system adapted to monitor the total electrical power consumption of a diffusion plant and to offset changes in plant load so as to maintain the total power consumption at a preselected value. The system adjusts the power consumption of a selected group of diffusion stages as required to offset changes in load in the remainder of the plant. Adjustment of the power consumption of these stages is effected by an electro-pneumatic control system which varies the process gas flow through the stages.

Background of the invention

This invention was made in the course of, or under, a contract with the U.S. Atomic Energy Commission.

This invention relates to an automatic electrical load controller, and more specifically to an automatic electrical load controller which controls an electrical power load within a prescribed value.

In a plant which has a high rate of consumption of electrical power, it is an ever present economic problem to maintain the total load consumption within a prescribed value while maintaining a high load factor. Many devices are available to aid in solving the above problem. For example, an electrcal load anticipator which indicates the prevailing energy consumption in a power metering system and projects a power demand for a given demand interval, is used by a plant operator to manually adjust the load to maintain power consumption within a prescribed value. The load anticipator is a tremendous aid in load control; but, this does not provide automatic load control. The result in a large plant is that control of the plant load factor necessitates time-consuming communication between a plant power dispatcher and the operator who adjusts the consumption for load control. Some plants, for example, a gaseous diffusion plant, may operate at times with a total power input of approximately 2000 megawatts. Obviously, it is important to operate such a plant very close to the scheduled load to avoid or minimize excess demand charges. In other words, it is important to constantly maintain a very high electrical load factor.

Summary of the invention

The load controller of this invention provides truly automatic load control within a prescribed value for a multiple stage plant. The general concept of the invention involves continuously measuring the total power input to a multiple stage plant to be controlled while simultaneously measuring the load of a selected group of the stages designated as a control load. These measurements are made with conventional instrumentation and the output of each is a voltage proportional to the applied power input. The outputs are applied to a comparison circuit which provides an output proportional to the difference in the total load and the control load. The output of the comparison circuit is applied to an amplifier which in turn feeds an electrical-to-pressure transducer. The output of the transducer is connected to pneumatic instrumentation of the control load which controls the power consumption of the control load thereby providing load control of the entire system within the prescribed limit. A special rate detector is connected to the output of the amplifier, and through proper relaying responsive to the output thereof, disables the control system in case of an abnormal change in load out of the range of the prescribed control range.

Accordingly, it is an object of this invention to provide an automatic electrical load controller for a multiple stage plant.

Further, it is an object of this invention to provide a load controller for controlling a multiple stage plant within a prescribed value.

Another object of this invention is to provide an automatic load controller with means for disabling the control when abnormal changes in total load occur.

Other objects and many of the attendant advantages of the present invention will become evident from the following description when taken in conjunction with the accompanying drawings.

Brief description of the drawings

FIG. 2 is a schematic diagram of a special rate detector shown in FIG. 1.

Description of the preferred embodiments

Figure 1:
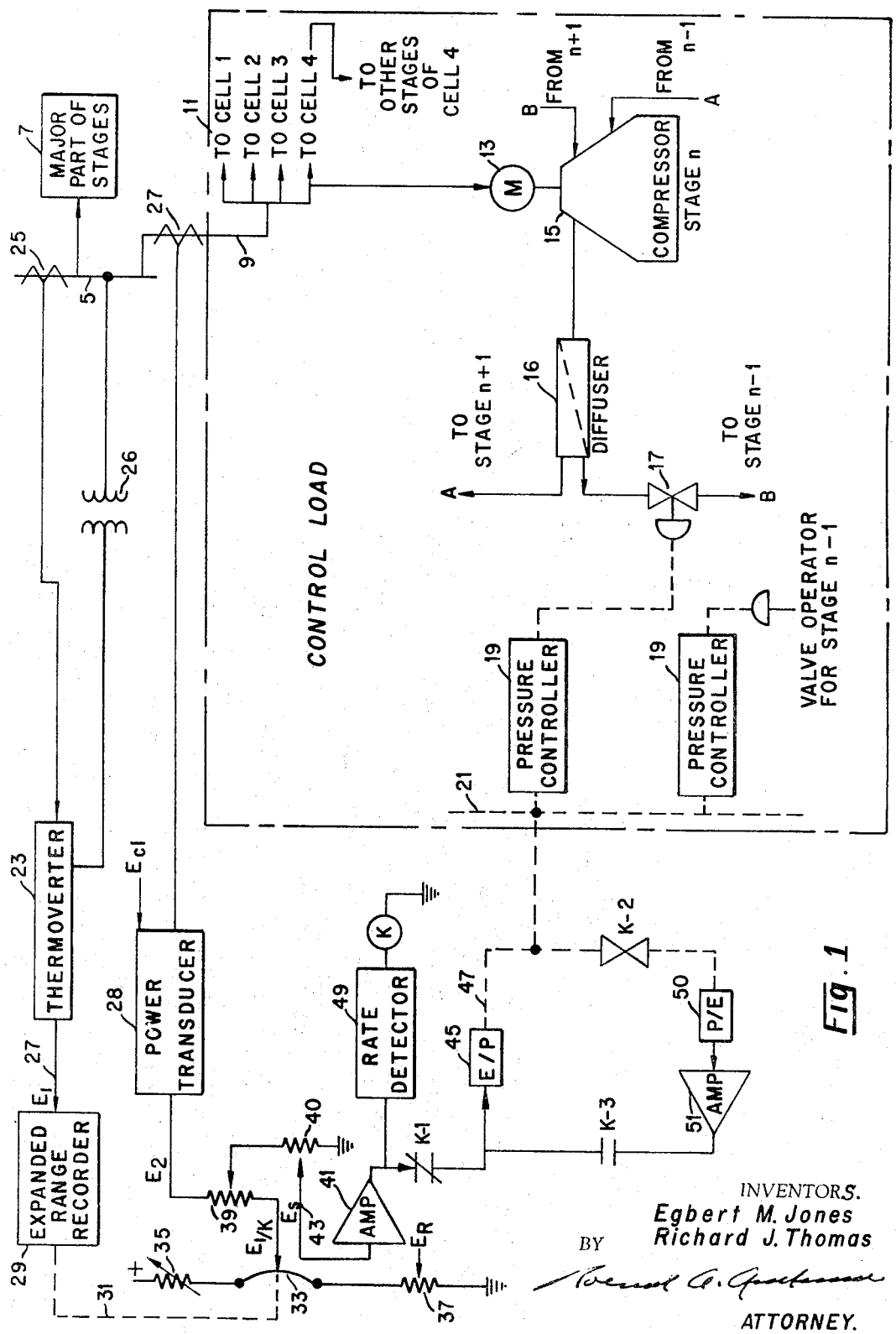
FIG. 1 is a block diagram of a load controller according to the present invention.

Referring now to FIG. 1, there is illustrated in block diagram form a load controller according to the principles of this invention. A three-phase main power bus 5 is connected to the various stages of a multiple stage plant. For example, this may be a gaseous diffusion cascade which comprises a large number of essentially identical gaseous diffusion stages connected in series with respect to the process gas flow. The major part of the stages is indicated by reference numeral 7. The cascade equipment is arranged in small groups of successive stages known as cells. In the example given here four cells are treated as a sub-division from the major part 7 and connected to the main bus 5 by bus 9 forming a control load 11. As shown in FIG. 1, the control load 11 consists of a plurality of cells, each consisting of stages of the kind designated as stage n. As indicated, the drive motor 13 for the stage compressors 15 of a cell are connected in parallel, and the various cells comprising the control load 11 are connected in parallel to bus 9.

The typical diffusion stage includes a diffuser 16 connected in fluid communication with compressors 15 and a pneumatically-operated control valve 17 connected in series with the B (depleted process gas) line to maintain the pressure in that stage at a desired operating value. The control valves 17 are provided individually with pressure controllers 19 whose outputs are proportionally responsive to the air pressure in a pressure level index (PLI) header 21. The PLI header 21 is common to the cells comprising the control load 11, and a pressure change in the header 21 is reflected in a proportional pressure change in the stages comprising the control load 11. If, for example, the PLI header 21 pressure increases, the control valves 17 are re-positioned to effect a proportional increase in stage pressures and therefore an increase in the electrical power consumption of the stage compressor motors 13. Thus, an increase in the PLI 21 pressure produces a given increase in the power consumption of the stages comprising the control load 11. As mentioned, the subject controller maintains the total cascade load contsant by adjusting the electrical consumption of the control load 11, the controller adjusts the control load by varying the PLI header pressure automatically.

Still referring to FIG. 1, the total cascade load is monitored by a thermoverter 23 having a current input connected to a three-phase instrument current transformer 25 and voltage input from instrument potential transformer 26. Transformer 25 is disposed to measure the total current of all the diffusion stages. The thermoverter 23 is presented here as one unit, where actually there is a three-phase unit per transmission line and the output from all units is in series connection to yield a signal equivalent to the total plant electrical load.

The thermoverter 23 is a commercially available instrument such as the Model W878, Type 2T made by the Bristol Company, Waterbury, Conn. This unit converts A.C. watts to a proportional D.C. millivolt signal when current from the current transformer 25 and voltage from the potential transformer 26 are impressed. The control load 11 is monitored by a power transducer 28. In the preferred embodiment, this is a "Hall effect" power transducer having separate current and voltage windings (not shown). The current winding is connected to a current transformer 27 disposed to monitor the current in bus 9 feeding the control load 11. Other standard instrumentation (not shown) feeds the voltage winding of transducer 28 with a voltage $E_{c1}$ which is proportional to that across the stage motors of the control load 11 and whose phase, relative to the current input to transducer 28, is adjusted to duplicate the phase angle for the stage motors 13 of the control load 11. The device is a power transducer in the real power, as opposed to the average power, of the control load at a given power factor is to be measured to effect proper load control. For example, if the control load 11 were operating at a 93% power factor, the phase angle of the transducer 28 is adjusted to correspond with the load being measured so that the output signal from the transducer is proportional to the real power of the control load 11. The device is a power transducer in the sense that it generates a D.C. millivolt output proportional to the wattage input.

Referring back to the thermoverter 23 (FIG. 1), the D.C. millivolt output is connected by means of lead 27 to an expanded range recorder 29 which is zero suppressed, that is, assuming a full scale reading (0–100 millivolts), the first 90 millivolts are blocked out so that the recorder only sees 10 millivolts above the 90 millivots and due to "zero suppression" the recorder does not respond until the input exceeds 90 millivolts and when the input does exceed 90 millivolts it only takes 10 additional millivolts to cause a full scale reading. Thus, the recorder only records the voltage in a given range corresponding to the calibrated proportion between watts and the D.C. millivolt output of the thermoverter 23. Thus, as indicated in FIG. 1, to maintain a total load of 1560 megawatts the recorder is zero suppressed to see a variation between 1500–1600 megawatts. The recorder primemover is mechanically coupled by means of a mechanical linkage 31 to a retransmitting slide wire 33 which is calibrated to provide an output proportional to the changes in total load. The slide wire 33 is connected in a series resistance circuit consisting of a variable resistor 35 and a potentiometer 37. A voltage is applied across the circuit which is of sufficient magnitude to provide a current of 3.5 milliamps through the slide wire 33, which has a resistance of 100 ohms. For each megawatt of input exceeding 1500 megawatts, the slide wire is moved through a distance corresponding to one ohm. Thus, a load change of one megawatt in the 1500–1600 range produces a change of 3.5 millivolts in the slide wire output $E_{1/K}$. This output is connected to one end of a potentiometer 39 while the output of transducer 28 is connected to the other end of potentiometer 39. The circuit of transducer 28 is calibrated so that the output voltage $E_2$ is changed by 3.5 millivolts for a one-megawatt change in the control load.

Voltages $E_{1/K}$ and $E_2$ are combined subtractively across potentiometer 39 to provide an output voltage which is proportional to the difference in the total load and the control load 11. This voltage is impressed across a potentiometer 40 to provide an error signal $E_s$. $E_s$ is impressed on an amplifier 41 by means of lead 43. Amplifier 41 inverts and amplifies the signal $E_s$ to a value selected as the input to an electrical-to-pressure transducer 45 to which it is connected through a normally closed relay contact K–1. The pneumatic output of transducer 45 is connected to PLI header 21 by means of a pneumatic connection 47.

As mentioned above, the system maintains the total load within a prescribed value. The subject controller is designed to keep the total load constant by compensating for relatively small variations in load. In a typical diffusion cascade application, the controller has a control band of ±3 megawatts. It is not desirable that the controller attempt to compensate for large changes in load (e.g., rapid decrease of 10 megawatts or more). Consequently, a special rate detector 49 is incorporated in the system to sense large changes in total load and operate a lockout relay K connected to the output of the detector. The detector input is connected to the output of amplifier 41. Actuation of relay K closes remote controlled block valve K–2 connected between the PLI header 21 and a standard pneumatic-to-electrical transducer 50. Transducer 50 has an electrical output connected to an amplifier 51 which has an output connected to the input of transducer 45 through a set of normally open contacts K–3 of relay K. Valve K–2, transducer 50, amplifier 51, and contacts K–3 form a feedback loop which upon actuation closes valve K–2. Simultaneously, contact K–1 is opened, disconnecting transducer 45 from amplifier 41, and contact K–3 is closed, applying to transducer 45 a voltage equal to the output from amplifier 51 at the time just prior to an abnormal change. Thus, the "lockout," or feedback arrangement automatically holds the control load 21 at its previous value and breaks the control loop to prevent the controller from adjusting the control load in an effort to compensate for abnormal variations.

Referring to FIG. 2, there is shown the schematic diagram of rate detector 49. It is adapted to energize relay K (shown in FIGS. 1 and 2) when the rate of load change exceeds a threshold value. If this threshold is exceeded, the detector triggers a silicon-controlled rectifier (SCR) 53 to energize the lockout relay K and thus isolate the control load 21 from the controller.

As shown, the detector includes an L–C filter 55 for removing 60- and 120-cycle ripple from the output of amplifier 41. Filter 55 consists of an inductor 57 connected in series with the input and a capacitor 59 connected between the circuit end of inductor 57 and ground potential. The filtered signal is differentiated by an R–C circuit consisting of a capacitor 61 connected in series with inductor 57 and the circuit input resistance which is approximately 25K ohms. A resistor 63 is provided in parallel with capacitor 59 whose value depends upon the threshold level desired at the input. The differentiated signal is fed to an input amplification section consisting of transistors 65, 67, 73, and 83. The signal is first fed to the base of a bias stabilizing transistor 65 and the base of a first emitter follower connected transistor 67. Transistor 65 has its collector connected to ground potential and its emitter connected to a 10 v. positive power supply through a biasing resistor 69 while transistor 67 has its collector connected to the +10 v. supply and emitter connected to the negative side of the +10 v. supply (−10 v.) through a biasing resistor 71. Transistor 67 has its emitter connected directly to the base of a transistor 73 which is connected in a standard amplifier arrangement. The collector of transistor 73 is connected to the +10 v. supply through a biasing resistor 75 while the base of transistor 73 is connected to the collector through a R–C bias stabilizing network 77. The emitter of transistor 73 is connected to ground through a biasing resistor 79 and to −10 v. through a resistor 81. The collector of transistor 73 is connected to the base of a second emitter-follower connected transistor 83 having its collector connected to a +10 v. and its emitter connected through a biasing resistor 85 to ground. The emitter of transistor 83 is coupled by means of a capacitor 87 to the base of a transistor 89 which is connected in a differential amplifier configuration with a transistor 91. The base of transistor 89 is connected to ground through a resistor 93. The collectors of transistors 89 and 91 are connected to a +20 v. supply through resistors 94 and 95, respectively, while the emitters are connected in common through a biasing resistor 97 to −10 v. and through biasing resistor 99 to ground potential. A voltage divider consisting of resistor 102 and potentiometer 101 is connected between +20 v. and ground with the adjustable lead of potentiometer 101 connected to the base of transistor 91 for equalizing the collector voltages of the differential amplifier when a steady calibration signal is applied. A pair of trigger circuits are provided to trigger SCR–53 responsive to input signals exceeding the threshold value of the detector. The trigger circuits consist of unijunction transistors 103 and 105 connected between +20 v. and ground through appropriate biasing resistors 107, 109, and 111. The gates of transistors 103 and 105 are connected through resistors 113 and 115, respectively, to the collectors of transistors 91 and 89, respectively. The collectors of transistors 91 and 89 are coupled to ground through capacitors 117 and 119, respectively. The base-one electrodes of unijunction transistors 103 and 105 are connected in common to the gate electrode of SCR–53. SCR–53 is connected in series with relay K and a normally closed contact K–4 of relay K. A diode 121 is connected across relay K to prevent transient voltage surges when the relay coil K is de-energized. When SCR–53 conducts, relay K locks itself in mechanically until its coil is pulsed by means of a manual "reset" switch (not shown). Contact K–4 removes the supply voltage from SCR–53 after the relay has been energized.

The detector is actuated by an abnormal change in the total load at a rate which exceeds the detector threshold. The threshold is determined by the value of capacitor 61 and the circuit input resistance forming the input differentiator as previously explained. For example, with a 80 µf. capacitor, and an input resistance of 25K ohms a load change of 14 megawatts/minute prevailing for 1 second or 8 megawatts/minute for 5 seconds would trigger the detector and actuate relay K.

This lock-out action of the rate detector will occur when the signal (after differentiation and amplification) is of sufficient magnitude to cause one of the unijunction transistors to conduct. The action of the unijunction transistor conducting yields a voltage spike which fires the SCR causing the relay K to actuate. Since the rate detector must operate on both a rapid rate of increase as well as a decrease in plant load, the circuitry has been arranged to actuate relay K for either condition. Transistor pair 89–91 makes up a differential amplifier which also acts as a phase inverter so a signal of either polarity will cause conduction of one of the unijunction transistors and the SCR.

In operation for a given load of 1560 megawatts, the controller is calibrated for the various values specified in Table I.

TABLE I

| | | |
|---|---|---|
| Total load | megawatts | 1560 |
| Control load | do | 62.26 |
| $E_{1/K}$ | millivolts | 318.1 |
| $E_2$ | do | 268.1 |
| $E_s$ | do | 50 |
| PLI header pressure | p.s.i.g | 10.5 |

Assuming the values as indicated in Table I, the operation of the controller will be discussed herein in terms of maintaining the total load at 1560 megawatts. As shown in FIG. 1 the total load is monitored by thermoverter 23 whose millivolt output, proportional to the total load, is recorded on the expanded range recorder 29 which is zero suppressed to "see" the load in the 1500–1600 megawatt range as previously described. The prime mover of recorder 29 is mechanically coupled to slide wire 33 which is calibrated to provide a voltage output $E_{1/K}$ equal to 318.1 millivolts for a 1560 megawatt input to thermoverter 23. Power transducer 28 monitors the control load which is set initially at 62.26 megawatts. The phase adjustment (not shown) of the transducer 28 is positioned to duplicate the phase angle of the control load motors 13 so the normal 268.1 millivolt output of transducer 28 is proportional to the real power consumption of the control load 11. The output from transducer 28 ($E_2$=268.1) and the output from slide wire 33 ($E_{1/K}$=318.1) are combined subtractively across potentiometer 39 to provide a voltage which is proportional to the difference in the total load and the control load 11. This voltage is impressed across potentiometer 40 and produces an error signal $E_s$ on load 43 of 50 millivolts.

The error signal $E_s$ is impressed across the inverting amplifier 41 which amplifies the signal to a value (5 volts) selected as the necesasry input voltage to drive the electrical-to-pressure transducer 45 which has been calibrated to provide an output pressure of 10.5 ps.i.g.; that is, the PLI header 21 is at 10.5 p.s.i.g. During calibration of the controller, the diffusion stages comprising the control load 11 are adjusted so that a PLI header pressure of 10.5 p.s.i.g. causes the control load stages to operate at the desired 62.26 megawatt power input.

In order to explain the operation of the controller during a normal load change, assume a 4 megawatt drop in power consumption of the major part of the stages 7 has occurred. The occurrence of such a drop in total load is reflected in an incipient drop in $E_{1/K}$, the output of the retransmitting slide wire 33. The controller responds immediately by increasing the load consumption of the control load 11 sufficient to restore $E_{1/K}$ essentially to its preset value. That is, the controller increases the power consumption of the control load 11 until the total load, monitored by thermoverter 23, returns to 1560 megawatts. To be more specific, the incipient decrease in $E_{1/K}$ is reflected in a decrease in $E_s$, or increase in the output of amplifier 41, and a sufficient increase in the output of transducer 45 to raise the PLI header 21 pressure from 10.5 to 12 p.s.i.g. This increase in header 21 pressure causes the pressure controller 19 to reposition the valves 17 in the B depleted lines of the control load diffuser stages which reflects as a load increase to the motors 13. The new values for equilibrium prevailing after the controller has readjusted the control load are shown in Table II.

TABLE II

| | | |
|---|---|---|
| Total load | megawatts | 1560 |
| Control load | do | 66.26 |
| $E_{1/K}$ | millivolts | 318.1 |
| $E_2$ | do | 282.1 |
| $E_s$ | do | 36 |
| PLI header pressure | ps.i.g | 12 |

These values will prevail until (a) the total load changes sufficiently to initiate another corrective action by the controller, or (b) an abnormal load change activates the rate detector 49. The controller described is capable of compensating for load changes as small as 0.1 megawatt.

For the purpose of explaining the operation of the feedback loop comprising valve K–2, P/E transducer 50, amplifier 51, and contact K–3, assume that an abnormal increase in total load has occurred. This will be reflected as a decrease in the output of inverting amplifier 41. When the rate of decrease in voltage to the detector 49 exceeds the detector threshold, relay K is locked in, as described previously. This results in the opening of contact K–1 removing the control circuit from the E/P transducer 45 while simultaneously closing valve K–2 and closing contact K-3. Thus, the prevailing PLI header pressure actuates the P/E transducer 50 connected to amplifier 51. The output of amplifier 51 is fed to the input of E/P transducer 45 to effectively maintain the control load 11 at the prevailing load just prior to the occurrence of the abnormal change in total load. With this feedback arrangement the load is controlled within a prescribed value, and the control load is protected from possible damage due to an effort to compensate for abnormal load variations.

The voltages indicated herein have been described as ground referenced. If desired, a reference voltage $E_r$ from the adjustable lead of potentiometer 37 may be used as the reference voltage for the controller. With this arrangement, the potentiometer is used to adjust the total load set point—i.e., as a means of adjusting the controller to maintain the load at a value other than 1560 megawatts.

It will be seen from the foregoing disclosure that an automatic, electrical load controller has been provided which controls the total load within a prescribed value and can be used in numerous applications for close load control of a multiple stage plant.

It will be understood that, while a specific preferred embodiment of the present load controller has been set forth, the invention is not limited thereto and various modifications and refinements may be made within the skill of the art without departing from the spirit and scope of the invention as set forth in the appended claims.

What is claimed is:

1. An electrical load controller for controlling the electrical power consumption of a multiple stage fluid flow system within a preselected value wherein the power consumption of each stage is controlled by pneumatically actuated control valves comprising: a common bus for connecting electrical power to each of said stages; a first power monitoring means coupled to said common bus for providing a voltage output proportional to the total power load of all of said stages; a second power monitoring means coupled to said common bus for providing a voltage output proportional to the power load of a control stage; a comparison circuit connected to the output of each of said power monitoring means for providing an output signal proportional to the difference between the total cascade load and the load of said control stage; an amplifier connected to the output of said comparison circuit; an electrical-to-pressure transducer having an electrical input connected to an output of said amplifier and producing a pneumatic output signal proportional to the applied electrical input signal, and means for connecting the output of said transducer to said pneumatic control valves of said control stage, thereby automatically controlling the load of said system within said preselected value.

2. An electrical load controller as set forth in claim 1 further comprising means including a load rate detector connected to the output of said amplifier for automatically disabling said controller when an abnormal change in total load occurs.

3. An electrical load controller as set forth in claim 1 wherein said comparison circuit comprises an expanded range recorder having a predetermined threshold setting and providing a mechanical output whose movement is proportional to change in the output of said first monitoring means, a retransmitting slide wire connected to and positioned by the output of said expanded range recorder, said slide wire having an electrical output proportional to the output of said expanded range recorder, and circuit means for subtractively combining the output of said second power monitoring means and the output of said slide wire and providing an error signal output for connection to said amplifier.

4. An electrical load controller as set forth in claim 2 wherein said means for automatically disabling said controller further includes a lockout relay connected to the output of said detector, said detector having a threshold input so that abnormal changes in load reflected in a change in output of said amplifier exceeding said threshold energizes said rate detector, thereby operating said relay, a normally closed contact of said relay connected between the output of said amplifier and the input of said electrical-to-pressure transducer, and a feedback means actuated by said relay connected between the output and the input of said electrical-to-pressure transducer so that when said controller circuit is disabled the output of said electrical-to-pressure transducer is maintained at the pressure prevailing just prior to the disabling of the controller circuit, thereby preventing said control load from attempting to adjust for abnormal changes in total load of said system.

5. An electrical load controller as set forth in claim 4 wherein said feedback means comprises a normally open remote operated block valve connected in fluid communication with the output of said electrical-to-pressure transducer, said block valve being operated by said relay, a pressure-to-electrical transducer having a penumatic input connected in fluid communication with said block valve and an electrical output proportional to the pneumatic input, a feedback amplifier connected to the output of said pressure-to-electrical transducer, and a normally open contact of said relay connected between an output of said feedback amplifier and the input of said electrical-to-pressure transducer.

6. An electrical load controller as set forth in claim 4 wherein said rate detector comprises an input filter circuit, a signal differentiator connected to receive filtered input signals from said filter, an input amplification section having an input and an output, said input of said amplification section being connected to receive differentiated signals from said signal differentiator, a differential amplifier section having a first and second input and a first and second output, a capacitor connected between the output of said input amplification section and said first input of said differential amplifier section, a voltage divider connected to the second input of said differential amplifier, a first trigger circuit having an input and an output, said input of said first trigger circuit being connected to said first output of said differential anplifier, a second trigger circuit having an input and an output, said input of said second trigger circuit being connected to said second output of said differential amplifier, a silicon controlled rectifier having an anode, cathode, and gate electrodes, said anode and cathode electrodes being connected in series with said lockout relay and said gate electrode being connected commonly to said output of said first and second trigger circuits.

References Cited

UNITED STATES PATENTS

| | | |
|---|---|---|
| 2,923,831 | 2/1960 | Wallene. |
| 3,300,648 | 1/1967 | Rockefeller et al. ___ 307—35 X |
| 3,379,893 | 4/1968 | Cavanaugh _____ 307—34 X |

ROBERT K. SCHAEFER, *Primary Examiner.*

T. B. JOIKE, *Assistant Examiner.*

U.S. Cl. X.R.

307—126